(12) United States Patent  
Walsh et al.

(10) Patent No.: US 7,372,948 B2  
(45) Date of Patent: *May 13, 2008

(54) METHOD AND SYSTEM FOR PROVIDING ENHANCED CALLER IDENTIFICATION INFORMATION

(75) Inventors: Patrick J. Walsh, Bloomingdale, IL (US); Theodore J. Myers, East Dundee, IL (US); Jose M. Cruz, Naperville, IL (US); Bruce E. Stuckman, Austin, TX (US); John G. Rauch, Chicago, IL (US)

(73) Assignee: Ameritech Properties, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/516,116

(22) Filed: Sep. 6, 2006

(65) Prior Publication Data

US 2007/0121825 A1     May 31, 2007

Related U.S. Application Data

(63) Continuation of application No. 10/832,096, filed on Apr. 26, 2004, now Pat. No. 7,127,050, which is a continuation of application No. 09/535,333, filed on Mar. 27, 2000, now Pat. No. 6,748,068.

(51) Int. Cl.  
*H04M 1/56* (2006.01)

(52) U.S. Cl. .............................. 379/142.03; 379/142.01

(58) Field of Classification Search ................. 379/142.01–142.05, 142.09, 88.19, 88.21, 379/93.23

See application file for complete search history.

(56) References Cited

U.S. PATENT DOCUMENTS

| | | | |
|---|---|---|---|
| 4,277,649 A | 7/1981 | Sheinbein | 379/211.02 |
| 5,109,405 A | 4/1992 | Morganstein | 379/88.21 |
| 5,347,574 A | 9/1994 | Morganstein | 379/207.15 |
| 5,511,111 A | 4/1996 | Serbetcioglu et al. | 379/88.01 |
| 5,533,106 A | 7/1996 | Blumhardt | 379/142.02 |
| 5,651,053 A | 7/1997 | Mitchell | 379/210.02 |
| 5,898,770 A | 4/1999 | Valentine | 379/249 |
| 5,905,774 A | 5/1999 | Tatchell et al. | 379/88.04 |
| 5,991,367 A | 11/1999 | Robuck | 379/88.24 |
| 5,995,603 A | 11/1999 | Anderson | 379/142.05 |
| 6,067,355 A | 5/2000 | Lim et al. | 379/142.14 |
| 6,341,161 B1 | 1/2002 | Latter et al. | 379/142.01 |
| 6,748,068 B1 * | 6/2004 | Walsh et al. | 379/142.03 |
| 7,127,050 B2 * | 10/2006 | Walsh et al. | 379/142.03 |

* cited by examiner

*Primary Examiner*—Barry Taylor  
(74) *Attorney, Agent, or Firm*—Brinks Hofer Gilson & Lione

(57) ABSTRACT

A method and apparatus permit handling of unwanted calls from callers such as telemarketers, when caller identification is provided. In one embodiment, the called party adds the caller identification information for the telemarketer to a personal list after receiving the unwanted call. Subsequent calls from the telemarketer are intercepted. In a second embodiment, the called party identifies the telemarketer by detecting the caller identification information before answering the call. By providing a screen listing indication, the caller identification information is added to the called party's personal list before the call is completed, permitting the call to be intercepted and while future calls from the telemarketer to be intercepted.

8 Claims, 6 Drawing Sheets

METHOD AND SYSTEM FOR PROVIDING ENHANCED CALLER IDENTIFICATION INFORMATION

RELATED APPLICATIONS

This patent application is a continuation of U.S. application Ser. No. 10/832,096, filed Apr. 26, 2004 now U.S. Pat. No. 7,127,050, which is a continuation of U.S. application Ser. No. 09/535,333, filed Mar. 27, 2000, now U.S. Pat. No. 6,748,068, all of which are hereby incorporated herein in their entirety by this reference.

BACKGROUND

The present invention relates generally to telecommunication services and more particularly to caller identification.

Telecommunications service providers typically offer services that attempt to provide customers with information that enables them to determine whether or not to accept a call before answering the call. One service that provides such information is caller identification ("Caller ID"). Standard Caller ID services generally provide a customer with an indication of who is calling without requiring the customer to answer the call. These systems typically retrieve information about the calling party from a database and provide that information to the called party. Customer premise equipment (CPE) in the form of a display device is generally used to provide the called party with a visual readout of the name and/or telephone number associated with the calling party.

However, the effectiveness of Caller ID systems can be reduced due to a number of different occurrences. One such occurrence is the inability of a service provider to provide the standard Caller ID information for a particular incoming call. A service provider may not be able to provide the standard Caller ID information if the Caller ID information is blocked by the calling party, or if the Caller ID information is unavailable or incomplete. Also, the service provider may not be able to provide the standard Caller ID information if the call is marked "Private," indicating that the calling party has taken steps to suppress transmission of Caller ID information. This may be done, in some areas of the United States by, for example, pressing *67 when initiating a call When the standard Caller ID information cannot be provided, the called party is not adequately informed about who is calling and cannot determine whether or not to accept the incoming call before answering the call. Because the effectiveness of Caller ID systems is greatly reduced when information cannot be provided, there is a need for an improved system and method for providing caller identification information that overcomes these deficiencies.

Patent application Ser. No. 09/122,484, filed Jul. 24, 1998 and commonly assigned to the assignee of the present application, is incorporated herein by reference. This patent application discloses a method and system for providing a called party with audible caller identification information when standard caller identification cannot be provided. When standard caller identification cannot be provided, the call is blocked and a request for audible caller identification is transmitted to the calling party. The audible information is subsequently transmitted to the called party.

Patent application Ser. No. 09/253,339, filed Feb. 19, 1999 and commonly assigned to the assignee of the present application, illustrates in further detail implementation of this technique in a telecommunications system including Advanced Information Network (AIN) elements. This application is incorporated herein by reference.

However, some undesired calls may be received for which standard caller identification information can be provided. Some telemarketing calls include standard caller identification information and as a result will not be blocked by the system of patent application Ser. No. 09/122,484. Other telemarketers may use meaningless caller identification information or caller identification information which may be deceptive, for example in a fund raising cold call. Even though the called party receives the standard caller identification, the called party may unknowingly or inadvertently answer the call. This can result in unwanted interruptions of the called party and limits the ability of the called party to manage incoming calls and privacy.

U.S. Pat. No. 5,651,053 discloses a service in which a subscriber is given a special ring announcing an incoming call. When the subscriber answers the call, the caller is identified to the subscriber without connecting the caller to the subscriber, for example, by recording the caller announcing his identity in response to a prompt. The recording is played to the caller who has the option, without being connected to the caller, of accepting the call, refusing the call or directing the call to an automated answering system such as voice mail, for example, by a keypad entry. A caller list can be created enabling preferred callers to reach the subscriber without being screened and a refusal list can generated for automatically blocking calls from disfavored callers.

However, the disclosed system fails to disclose handling an incoming call for which the standard caller identification information can not be provided. All calls are given the same treatment of suspending the call before connecting the call to the subscriber. While a refusal list may be established, entries must be entered manually. No automatic processing of calls for which standard caller identification information cannot be provided is available.

Accordingly, there is a need for an improved method and apparatus for providing enhanced caller identification information in a telecommunication system.

DETAILED DESCRIPTION OF THE PRESENTLY PREFERRED EMBODIMENTS

By way of introduction, a method and apparatus in accordance with the illustrated embodiments provides for determining whether standard caller identification information can be provided for a received call. If not, the call is suspended and the calling party prompted to provide spoken caller identification information. This spoken caller identification information is recorded and played back to the called party, while the call is still suspended. The called party is presented with options for disposing of the call, such as by answering the call, refusing the call or routing the call to an automated answering system such as a voice mail answering system.

If standard caller identification information can be provided for the call, the call is terminated at the called communication station, which rings to announce the call. The standard caller identification information is presented to the called party. A screen listing indication may be detected, indicating that the called party wishes to place the calling communication station associated with the caller identification information on a list for having subsequent calls from the listed communication station intercepted. The called party may provide the screen listing indication before answering the call or after answering and disposing of the call.

Figure 1:
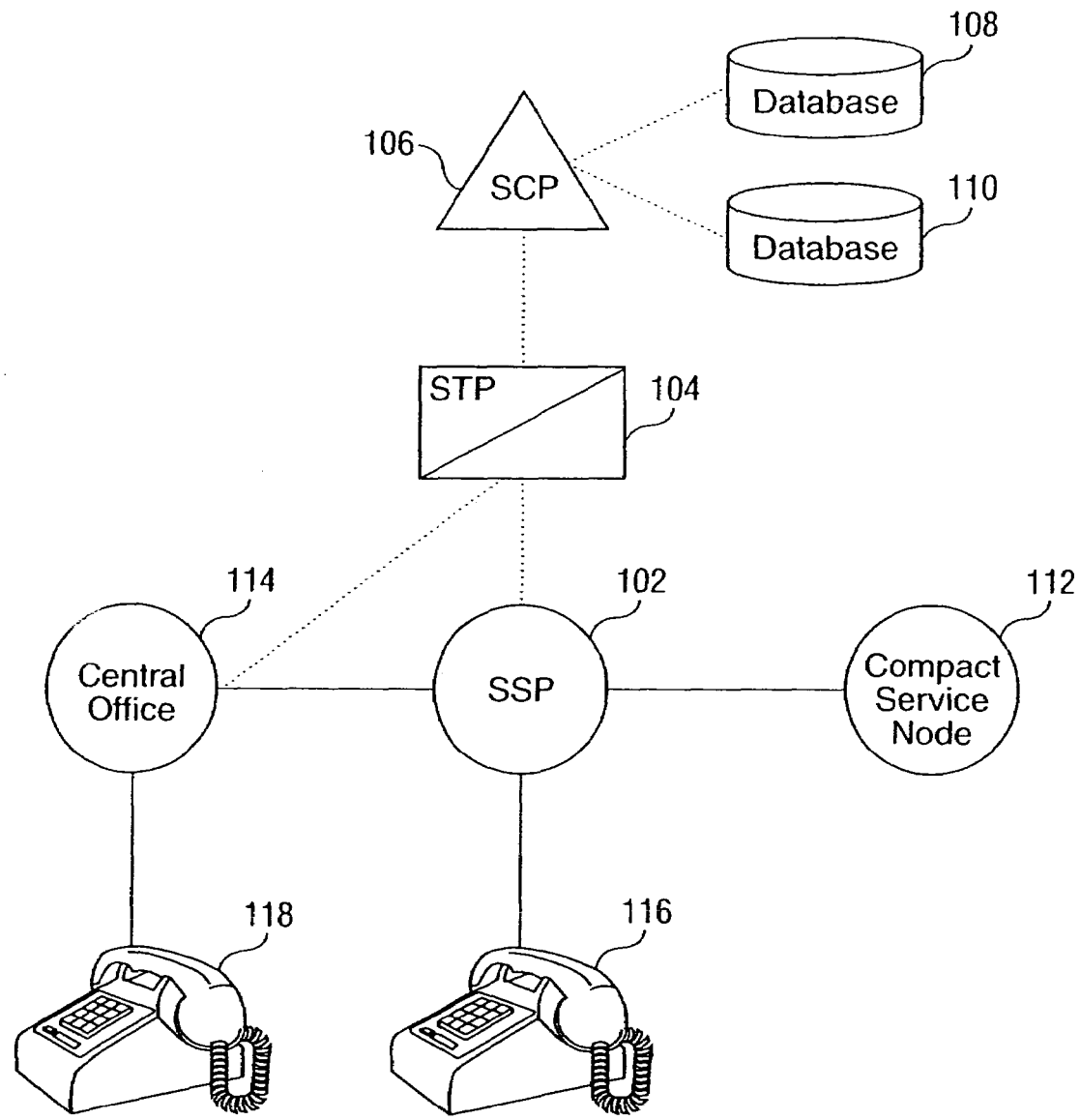
FIG. 1 is a block diagram of a telecommunications system.

Referring now to the drawing, FIG. 1 is a block diagram of a telecommunications system 100. The system 100 comprises a service switching point (SSP) 102, a signal transfer point (STP) 104, a service control point (SCP) 106, a first SCP database 108, a second SCP database 110, a compact service node (CSN) 112, a central office 114, called telephone station 116 and calling telephone station 118. Intelligent network system components, commonly referred to as advanced intelligent network (AIN) components, suitable for implementing the present embodiment are commercially available from several vendors and are known to those skilled in the art. AIN components can implement computer readable program code as known to those skilled in the art. Vendors of AIN components typically have a preferred programming language and operating platform as known to those skilled in the art.

SSP 102 preferably comprises an AIN switch that routes calls, recognizes and responds to triggers, generates queries to obtain call information and responds to returned call information. SSP 102 connects called telephone station 116 with central office 114 to enable calls to be placed between called telephone station 116 and calling telephone station 118. SSP 102 preferably communicates with SCP 106, central office 114 and CSN 112 by utilizing a signaling protocol such as Signaling System 7 (SS7) or other such signaling protocols as presently known to those skilled in the art or developed in the future. SSP 102 preferably generates queries to SCP 102 and receives and responds to responses to the queries returned from SCP 106. In the illustrated embodiment, communication between the SSP 102 and the SCP 106 employs Transaction Capabilities Applications Protocol or TCAP.

STP 104 preferably comprises a network element that transfers signaling communications in response to signaling protocols such as SS7 or other such signaling protocols as presently known to those skilled in the art or developed in the future. STP 104 preferably transfers queries from SSP 106 to SCP 106 and transfers responses to the queries from SCP 106 to SSP 102.

SCP 106 preferably comprises an AIN element that stores call information and receives and responds to queries. SCP 106 preferably stores call control information in the first SCP database 108 and can access the stored call control information. SCP 106 also stores standard caller identification information in the second SCP database 110 and can access the stored caller identification information. SCP 106 receives queries generated by SSP 102 and preferably responds to the queries by performing database searches to locate the requested call control information or caller identification information as known to those skilled in the art. SCP 106 can forward the call control information or caller identification information to SSP 102.

CSN 112 preferably comprises a network element such as a compact service node that enables communications between telephone stations 116, 118 and the network. CSN 112 can preferably transmit messages to and receive responses from telephone stations 116, 118. CSN 112 can generate announcements that can be transmitted to telephone stations 116, 118. CSN 112 can transmit responses such as audible caller identification information from telephone station 118 to telephone station 116 by connecting telephone stations 118, 116 or by recording and playing back the responses as known to those skilled in the art. The announcements transmitted to telephone station 116 preferably comprise accept and reject options along with requests for input from the telephone station 116. The requests for input preferably comprise requests for input that can be used by CSN 112 to cancel calls to telephone station 116, connect calls to telephone station 116, forward calls to a voice mail system or another location such as another telephone line, and transmit messages to telephone station 118. As used herein, the term voice mail system means all types of message recording systems as known to those skilled in the art. CSN 112 can preferably receive and respond to the input transmitted from telephone station 116. The term input means any suitable signal such as DTMF tones, voice input, dial pulse input or modem/fax input as known to those skilled in the art.

In alternative embodiments, other system equipment may provide the functions provided by CSN 112. For example, equivalent functionality may be provided by an AIN service node or by an Intelligent Peripheral, as those terms are understood in the art. These components and others which are operationally equivalent may be substituted for the CSN 112 in FIG. 1.

Database 108 preferably comprises a data storage element for use with SCP 106 as known to those skilled in the art. Database 108 preferably stores call control information that can be implemented by SSP 102 to control calls. Such call control information is known to those skilled in the art.

Database 110 preferably comprises a standard caller identification with name database as known to those skilled in the art. Database 110 preferably includes the name of the person associated with calling telephone station 118 along with the telephone number that is associated with calling telephone station 118. Database 110 can alternatively comprise a caller assistance database as known to those skilled in the art. While databases 108, 110 are depicted within a telecommunications system, databases 108, 110 can comprise any suitable databases containing information adapted for use in the present embodiment and are not limited to databases located within a telecommunications network. It is also important to note that while databases 108, 110 are shown as separate components, they can be implemented as a single database.

Central office 114 preferably comprises an AIN network switch as known to those skilled in the art. Central office 114 enables calls to be placed between calling telephone station 118 and called telephone station 116. Alternatively, central office 114 can comprise a non-AIN network switch as known to those skilled in the art.

Telephone stations 116, 118 preferably comprise analog telephone sets as known to those skilled in the art. Alternatively, telephone stations 116, 118 can comprise wireless, PCS, ISDN or any other form of communication station known to those skilled in the art. Called telephone station 116 preferably includes CPE equipment for use with caller identification services as known to those skilled in the art.

Figure 2:
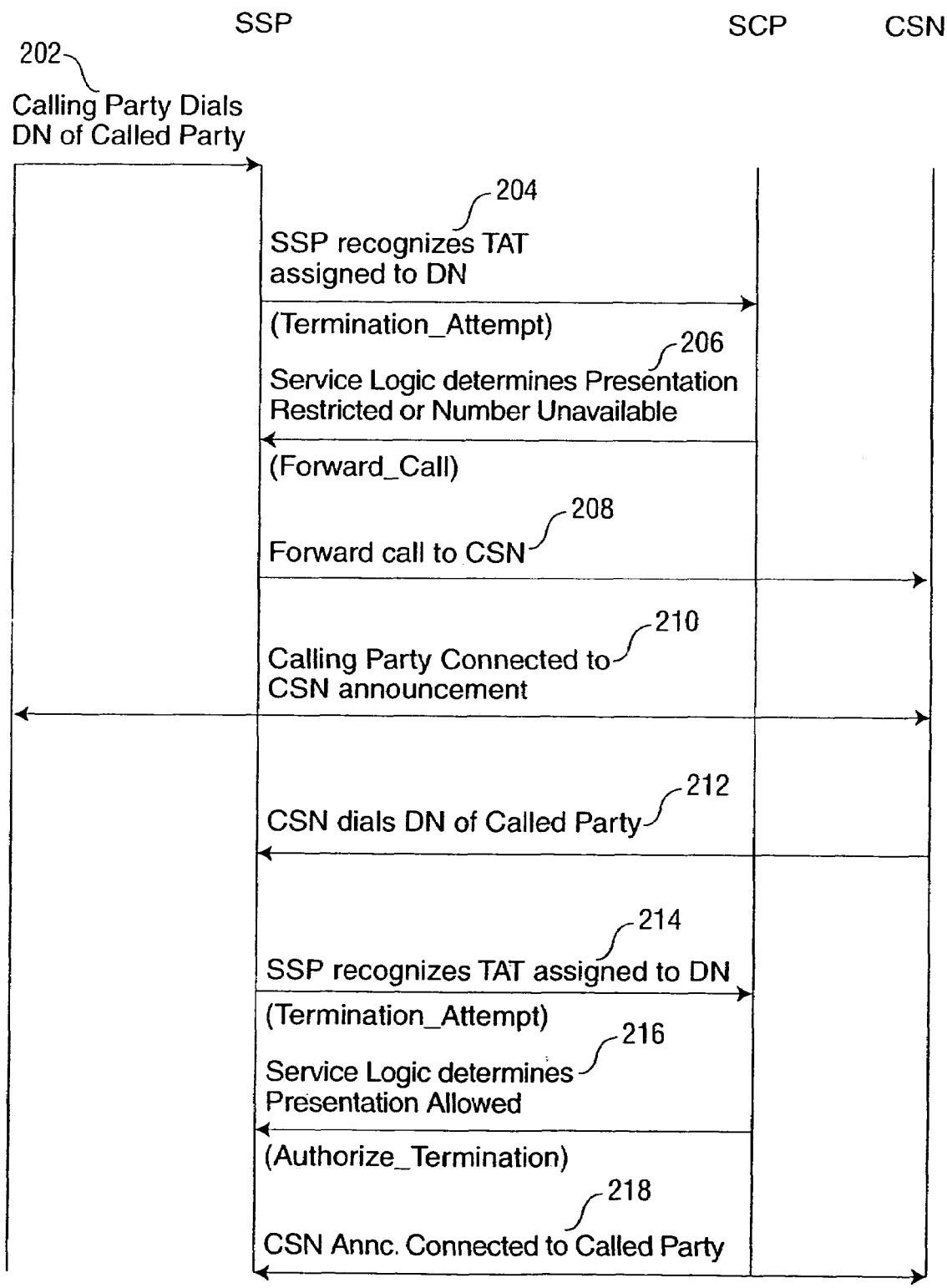
FIG. 2 is a call flow diagram illustrating a method for processing a call in the telecommunications system of FIG. 1.

FIG. 2 is a call flow diagram illustrating a method for processing a call in the telecommunications system 100 of FIG. 1. FIG. 2 illustrates communication between SSP 102, SCP 106 and CSN 112 (FIG. 1) for processing the call.

At step 202, the calling party at the calling telephone station 118 calls the directory number (DN) of the called communication station 116. The calling party may choose to enable Calling Number Delivery Blocking, for example, by dialing *67 before dialing the DN of the called communication station 116. This will block delivery of the standard caller ID information for the calling telephone station 118. In some systems, portions of the telecommunications system 100 such as the trunk group terminating the call may not pass the standard Caller ID information.

At step 204, the terminating SSP 102 recognizes that a terminating attempt trigger (TAT) is assigned to the called directory number. In response to the TAT, the SSP 102 creates a Termination_Attempt query message and transmits the query message to the SCP 106 for analysis. In the illustrated embodiment using AIN elements, the query message is formatted according to AIN Release 0.1 TCAP. The query message includes several parameters as is known to those ordinarily skilled in the art. For the Termination_Attempt query message, the following parameters are specified:

| | |
|---|---|
| UserID | DN to which the TAT is assigned (Called DN) |
| BearerCapability | 01 (3.1 KHz) |
| CalledPartyID | DN to which the TAT is assigned (Called DN) |
| Lata | Local Access and Transport Area of Called DN |
| TriggerCriteriaType | 15 (terminating attempt) |
| CalledPartyStationType | Originating Line Information of the Called DN |
| ChargeNumber | ANI of the originating facility or ANI of last forwarding station, if available |
| CallingPartyID | DN of the calling party (if available) |
| Presentation Restriction | 01 (Presentation Restricted) 10 (Number Unavailable) |
| ChargePartyStationType | Originating Line Information of the calling DN |
| OriginalCalledPartyID | First party that redirected the call |
| RedirectingPartyID | Last party that redirected the call |

If the calling party has blocked the standard Caller ID information, or if the system does not pass the standard Caller ID information for the calling communication station, the CallingPartyID parameter of the TAT query message will not be available. The Presentation Restriction Indicator parameter will be set to one of the binary values 01 or 10 to indicate this condition. This is in contrast to the situation in which the standard Caller ID information is available and the Presentation Restriction Indicator parameter is set to 00, to indicate presentation allowed.

In response to the Termination_Attempt query, the SCP 106 will validate the Presentation Restriction Indicator parameter of the CallingPartyID parameter. If the indicator is set to Presentation Restriction (01) or Number Unavailable (10), the SCP 106 will pass routing information to the SSP 102 in a Forward_Call response message, step 206. In the illustrated embodiment using AIN elements, the response message is formatted according to AIN Release 0.1 TCAP. The response message includes several parameters as is known to those ordinarily skilled in the art.

In a first embodiment, for the Forward_Call query message, the following parameters are specified:

| | |
|---|---|
| CallingPartyID | DN to which the TAT is assigned (Called DN from the Termination_Attempt query with presentation allowed) |
| CalledPartyID | Lead DN from the Basic Rate Interface (BRI) connecting the CSN |
| PrimaryCarrier | 0110 (LEC) |
| AMAslpID | 008780000 (uniquely identifies a service and indicates flat rate) |

Thus, in this first embodiment, the SCP 106 detects the CalledPartyID parameter of the Termination_Attempt query received from the SSP 102. As noted above, this parameter is set to the DN of the called party, or the directory number of the called telephone station. The SCP 106 places this value in the Forward_Call response for the CallingPartyID parameter. The CallingPartyID parameter of the Forward_Call response has an associated Presentation Restriction Indicator parameter. The SCP 106 marks this Presentation Restriction Indicator as presentation allowed.

In this manner, the system and method according to the first embodiment avoids the problems that arise when the called party subscribes to a per line blocking service. When per line blocking is activated, the system equipment including the SCP 106 and the SSP 102 is prevented from transmitting the Caller ID information for the called party. In subsequent processing by the system 100, the SSP 102 lacks the called telephone station directory number to complete the call back to the called telephone station. In the illustrated embodiment, the called telephone station DN is read from the TAT query and placed in the CallingPartyID parameter of the Forward_Call response. The SSP 102 can subsequently read the value of this parameter, avoiding the per line blocking limitation.

In a second embodiment, a different parameter is used in Forward_Call response message for communicating the called telephone station's DN. This parameter is the RedirectingPartyID. In this embodiment, the SCP 106 places the CalledPartyID DN from the Termination_Attempt query message into the RedirectingPartyID of the Forward_Call response message. The RedirectingPartyID has an associated Presentation Restriction Indicator parameter. The SCP 106 sets the associated Presentation Restriction Indicator parameter to presentation allowed. In this embodiment, the Forward_Call query message has parameters specified as follows:

| | |
|---|---|
| CallingPartyID | DN of the Calling Party (if available) |
| CalledPartyID | Lead DN from the Basic Rate Interface (BRI) connecting the CSN |
| PrimaryCarrier | 0110 (LEC) |
| RedirectingPartyID | DN to which the TAT is assigned (Called DN from the termination_attempt query) with presentation allowed (overwrites redirection information that the SSP would normally provide) |

-continued

| | |
|---|---|
| AMAslpID | 008780000 (uniquely identifies a service and indicates flat rate) |

In this manner, the system and method according to the second embodiment avoids the problems that arise when the called party subscribes to a per line blocking service.

At step 208, the SSP 102 receives the Forward_Call response message and originates a new call for the forwarded leg. The SSP 102 merges the new originating call and the existing terminating call. That is, the SSP 102 bridges or reconfigures the call. At this point, the SSP 102 routes the call as if it received an Analyze_Route message, using the CalledPartyID in the Forward_Call message to identify the new party. In the first embodiment described above, the CallingPartyID is the DN to which the termination attempt trigger is assigned. In the second embodiment, the redirecting number is the DN to which the termination attempt trigger is assigned. The SSP 102 forwards the call to the CSN 112.

At step 210, the forwarded call is answered by the CSN 112. The CSN 112 is operative to generate an announcement that is transmitted to the calling telephone station 118. One example of a suitable announcement is "The party you are calling does not accept calls from unidentified numbers. At the tone, say your name or the company you represent and your call will be completed." The CSN 112 then detects a response. If the calling party provides a response, the response is recorded as audible caller identification information for subsequent playback to the called party. If no response of provided, the call is terminated.

At step 212, the CSN 112 originates a new call to the called telephone station 116. In the first embodiment described above, the CSN 112 originates the new call to the DN found in the CallingPartyID parameter of the Forward_Call response message. The parameter was set to the DN to which the TAT is assigned. In the second embodiment described above, the CSN 112 originates the new call using the DN found in the RedirectingPartyID parameter of the Forward_Call response message. The parameter was set to the DN to which the TAT is assigned.

At step 214, the SSP 102 recognizes that a terminating attempt trigger (TAT) is assigned to the called DN. Based on the TAT, the SSP 102 creates a termination_attempt query message and transmits the query message to the SCP 106 for analysis. The parameters required for the AIN release 0.1 TCAP query message in the illustrated embodiment are as follows:

| | |
|---|---|
| UserID | DN to which the TAT is assigned (Called DN) |
| BearerCapability | 01 (3.1 KHz) |
| CalledPartyID | DN to which the TAT is assigned (Called DN) |
| Lata | Local Access and Transport Area of the Called DN |
| TriggerCriteriaType | 15 (Termination Attempt) |
| CalledPartyStationType | Originating Line information of the called DN |
| ChargeNumber | ANI of the originating facility |
| CallingPartyID | DN of the calling party (CSN DN) |
| Presentation Restriction | 00 (Presentation Allowed) |
| ChargePartyStationType | Originating Line information of the calling DN |

At step 216, the service logic of the SCP 106 will validate the Presentation Restriction Indicator of the CallingPartyID parameter of the query message. If the indicator is equal to Presentation Allowed, the SCP 106 will create an Authorize_Termination response message and send it to the SSP 102. The parameters required for the AIN release 0.1 TCAP response message in the illustrated embodiment are as follows:

| | |
|---|---|
| CallingPartyID | DN of the calling party (CSN DN) |
| ChargeNumber | ANI of the calling party |
| ChargePartyStationType | Originating Line information of the calling DN |
| DisplayText | CNAME information |

At step 218, when the called party answers the called telephone station 116, in the illustrated embodiment the CSN 112 first plays an identifying message and requests a keypress input. This ensures that a human is present to answer the called telephone station 116 and distinguishes the case where a modem, fax or other equipment answers the called telephone station 116. If the called party accepts the call, the CSN 112 connects the original calling party at the calling telephone station 118 to the called party at the called telephone station 116.

Figure 3:
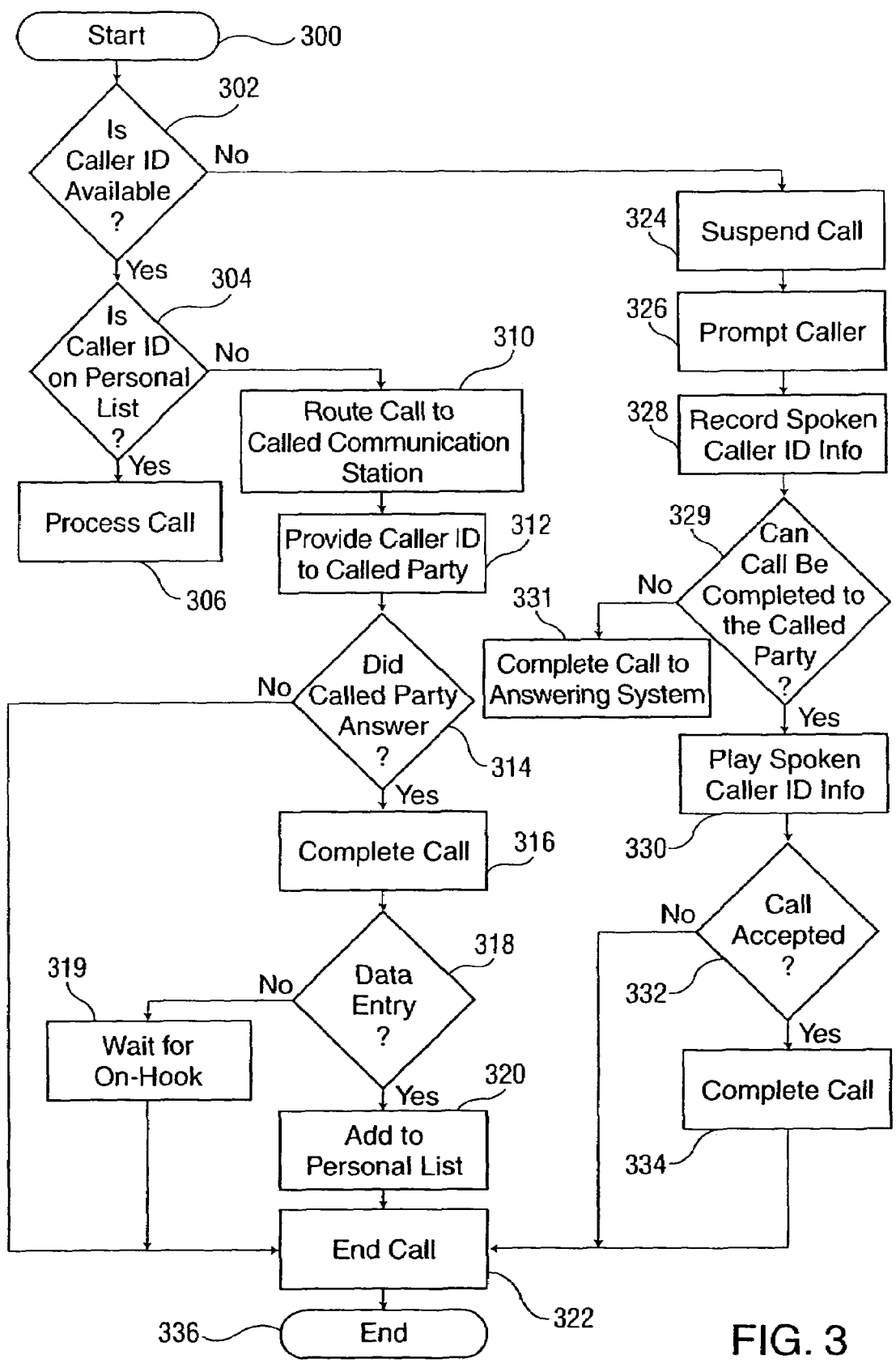
FIG. 3 is a flow diagram illustrating operation of the telecommunication system of FIG. 1.

Referring now to FIG. 3, it shows a flow diagram illustrating a method for providing enhanced caller identification information. In one embodiment, the method may be implemented in a telecommunications network including AIN elements as shown in FIG. 2. Other embodiments may be implemented as well using both wireline and wireless technologies. The method begins at block 300.

In block 302, it is determined if caller identification information is available for a call. The call has been placed by a calling party at a calling communication station, intended for a called party at a called communication station in a telecommunications network. In the exemplary embodiment of FIG. 2, the CallingPartyID parameter and the Presentation Restriction parameter of a Termination_Attempt (TAT) query message are examined.

If caller identification information is available, at block 304 it is determined if the caller identification information is on a personal list or intercept list maintained for the called party. The personal list may be stored at any convenient location in the network, such as at the database associated with a Service Control Point or a separate database corresponding to another service node or a peripheral device. The personal list is established when the called party subscribes to the service. Caller identification information may be added to the list or deleted from the list under control of the subscriber. Caller identification information may be automatically deleted from the list upon satisfaction of a predetermined condition, such as expiration of a predetermined time period or reassignment of the calling line identifier to a new subscriber in the network.

Block 304 includes, in the embodiment of FIG. 2, comparing the CallingPartyID parameter of the Termination_Attempt query of Forward_Call query to elements of the personal list. In AIN systems, the CallingPartyID is the directory number of the calling communication station. The personal list may preferably store caller identification information in directory number format for ready comparison without translation and for reduced storage size. Alternatively, the personal list may store an alphanumeric identifier such as text that is more readily understandable by the called party using standard caller identification service equipment. Thus, block 304 may further involve translating an identifier such as a directory number to an alphanumeric indicator or vice versa.

If the caller identification information is on the called party's personal list, the called party has previously indicated that calls associated with the calling communication station should be intercepted and processed, block 306. The call processing may take on several forms. FIGS. 4, 5, 6, and 7 set forth various embodiments of the present invention for processing a call in accordance with the present invention.

If, at block 304, the caller identification information associated with the call was not on the called party's personal list, at block 310 the call is routed to the called communication station. In the example of FIG. 2, in response to a Forward_Call query, message, a service switching point (SSP) or other network element bridges or reconfigures the terminating call and a new originating call and forwards the call to the compact service node (CSN) serving the called communication station. The CSN originates a new call to the called communication station. At block 312, the caller identification information is provided to the called party. This may be done, for example by providing a visual display at the called communication station or by providing an audible indication using the caller identification information. Any suitable method of providing the caller identification information may be employed. However, the called party may not receive the provided caller identification information, for example, if the called party is using an extension that does not provide such visual or audible indications.

At block 314, it is determined if the called party answers the call. If so, the call is completed as shown in block 316 and at block 318, it is determined if a data entry was received from the called party that corresponds to a screen listing indication. Such an indication may be any suitable string of digits or characters, such as the three characters *##. If the entered data corresponds to the screen listing indication, at block 320, the caller identification information associated with the call is added to the personal list for the called party. The personal list may include any suitable representation of caller identification information, such as the directory number for the calling party, the name information associated with the directory number, or both of these representations or some alternative representation. After adding the caller identification information to the called party personal list, the call is ended at block 322.

If a negative result was provided at block 314 the method ends without the call being completed as shown in block 316. If a negative result was provided in decision block 318, the method waits for the called party to go on-hook before ending the call as shown in block 319. Any other suitable result may alternatively be selected for any of these decision blocks.

If, at block 302, caller identification information was not available, control proceeds to block 324. Generally, the call flow illustrated above in connection with FIG. 2 is preferably followed. A Termination_Attempt query from an SSP to a service control point will include a Presentation Restriction parameter indicated that the CallingPartyID parameter is unavailable for the call. At block 324, the call is suspended. In response to the Termination_Attempt query, the SCP will validate the Presentation Restriction parameter and will pass routing information to an SSP in a Forward_Call response message. The SSP receives the Forward_Call response message and forwards the call to a compact service node (CSN).

In response to the forwarded call, the CSN generates an announcement that is transmitted to the calling communication station. At block 326, the calling party is prompted for spoken caller identification information. A message may be played to the caller inviting the caller to state a name or other identification information. At block 328, the spoken caller identification information is recorded for subsequent playback. The CSN then originates a new call to the called telephone station. The SSP recognizes that a terminating attempt trigger (TAT) is assigned to the called directory number of the called communication station. A Terminating_Attempt query message is generated. In response to the query message, the SCP creates an Authorize_Termination message which is sent to the SSP.

At this point the method determines if it can complete the call to the called party, as shown in decision block 329. In one embodiment, the called party's telephone rings and if an off-hook condition is detected, the called party is prompted to press a particular key, such as the "1" key to continue. If the appropriate DTMF signal, corresponding to the particular key, is not received in response to the prompt after an appropriate wait interval, it is assumed that the call was not answered by a person. In this case the call is completed between the calling party and the called party in order for the calling party to leave a message on an automated answering system associated with the called communication system, such as a voice mail system or answering machine, as shown in block 331. If the appropriate DTMF signal is received, the method proceeds to block 330.

At block 330, the spoken caller identification information is played back to the called party. The called party is given an opportunity to accept or decline the call, block 332. Other options, such as routing to voice mail, may be provided as well. If the call is not accepted, control proceeds to block 322 where the call is ended. Optionally, a message is played to the calling party prior to the end of the call. The text of the message may be selected by the called party either in block 332 or block 320 from several optional messages. In an alternative embodiment, a different message may be played depending on whether the method proceeded to block 322 from block 332 or block 320. In a further alternative embodiment, a single predetermined message may be used. If the call is accepted, at block 334 the call is completed between the calling party and the called party. The method embodied in FIG. 3 ends at block 336.

Figure 4:
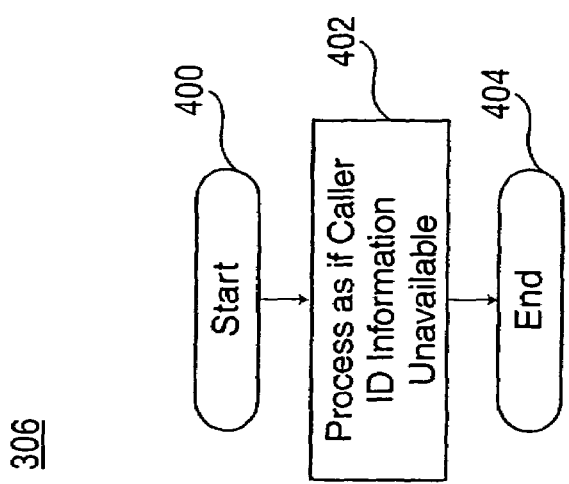
FIG. 4 presents a flow diagram illustrating a method for processing a call on the called party's intercept list in accordance with an embodiment of the present invention.

FIG. 4 presents a method for processing a call on the called party's intercept list in accordance with an embodiment of the present invention. In this embodiment, the intercepted call is treated as a received call where the caller ID information is either blocked or unavailable. The audible caller ID information is recorded from the caller's voice. The method begins in block 400 and in block 402, the call is processed as if the caller ID information is either blocked or unavailable. Referring back to the method of FIG. 3, in one possible embodiment, the method would proceed from decision block 304 directly to block 324. This method is easy to implement if the methods of blocks 322-336 have already been implemented for callers whose caller ID information is either blocked or unavailable. If a called party has previously indicated that a particular caller be included on the intercept list, that calling party can only be connected to the called party if the called party, after being informed who has called, agrees to accept the call.

Figure 5:
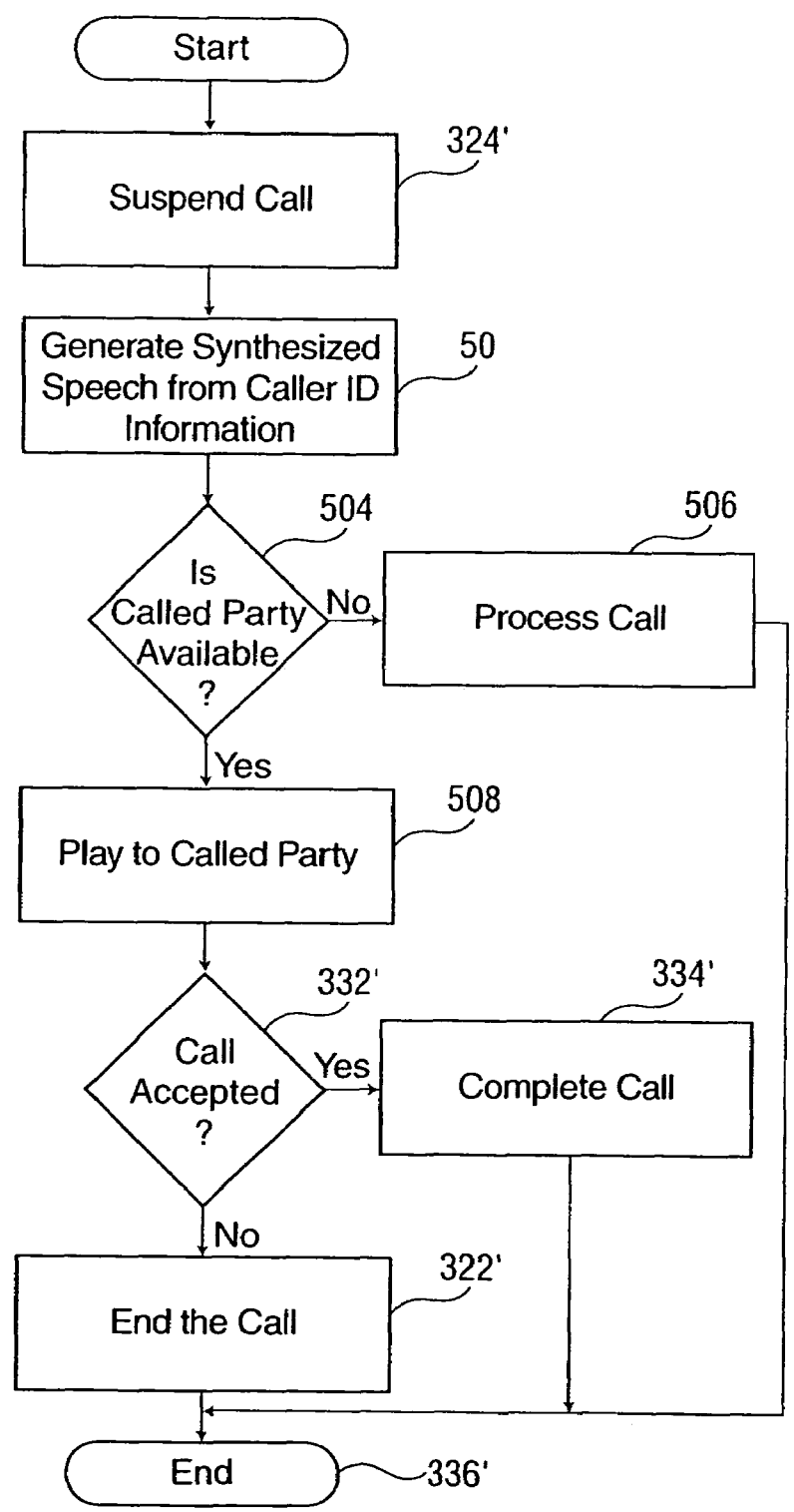
FIG. 5 presents a flow diagram illustrating a method for processing a call on the called party's intercept list in accordance with an embodiment of the present invention.

FIG. 5 presents a method for processing a call on the called party's intercept list in accordance with an embodiment of the present invention. In this embodiment, the intercepted call is treated similarly to a received call where the caller ID information is either blocked or unavailable. However, since the caller ID information is present, there is no need to prompt the calling party for a name. The received caller ID information can be used to generate an audible indication of the calling party. Blocks 322', 324', 332', 334' and 336' correspond, respectively to blocks 322, 324, 332, 334 and 336 discussed in conjunction with FIG. 3.

After the call is suspended in block 324, the caller ID information text is used to generate corresponding synthesized speech signals. In one embodiment of the present invention, compact service node 112 employs text-to-speech conversion to provide audible caller ID information based on caller name information, caller telephone number information or both. If caller name information is used, the caller name information can be preprocessed to provide a more accurate audible indication of the calling party. Pending U.S. patent application Ser. No. 09/240,522, titled "Method and System for Text-to-Speech Conversion of Caller Information," filed 29 Jan. 1999, U.S. patent application Ser. No. 09/044,574, titled "Method and System For Providing Enhanced Call Waiting," filed 19 Mar. 1998, and U.S. patent application Ser. No. 09/303,157, titled "Method and System For Providing Enhanced Call Waiting With Verification and Name Change Service," filed 30 Apr. 1999, the subject matter of which applications are incorporated herein by reference, provide a more detailed description of this preprocessing. In decision block 504, if the calling party is available, the audible caller ID information is played to the called party in block 508 and the call is processed further in blocks 332', 334', 322' and 336' as if the calling party information were not available. In these embodiments, the called party is thereby given the option of accepting the call from the calling party or disposing of the call without having the call completed.

Figure 6:
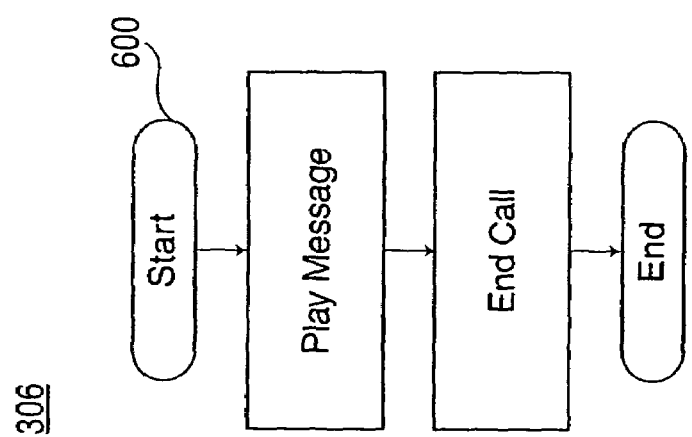
FIG. 6 presents a flow diagram illustrating an additional method for processing a call on the called party's intercept list in accordance with an embodiment of the present invention.

FIG. 6 presents an additional method for processing a call on the called party's intercept list or personal list in accordance with an embodiment of the present invention. In this embodiment, unlike the methods described in conjunction with FIGS. 4 and 5, in every instance the call is ended without completing the call to the called party. This means, in effect, that the called party will not receive calls from that particular party.

The method begins in block 600 and a message is played to the calling party in block 602. The message may ask the calling party to take the called party off a list of telemarketing calls or alternatively may be a message indicating that the called party does not accept telemarketing calls. After the message is played, the call is ended as shown in block 604 and the method ends in block 606. In one embodiment of the present invention, compact service node 112 plays the message to the caller. However, other embodiments are possible within the scope of the present invention. Other peripheral devices and other service nodes such as the SCP may likewise perform this function.

This embodiment of the present invention affords more privacy than the embodiment of FIG. 5. Because the called party is never connected to the call, the telephone never rings and the called party is not interrupted.

Figure 7:
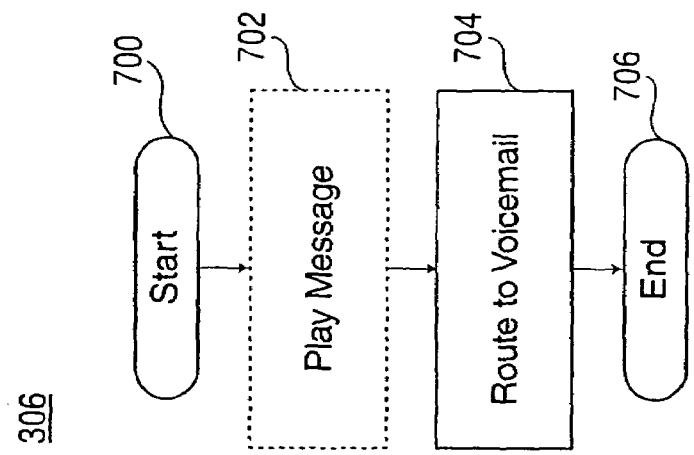
FIG. 7 presents a flow diagram illustrating a further method for processing a call on the called party's intercept list in accordance with an embodiment of the present invention.

FIG. 7 presents a further method for processing a call on the called party's intercept list in accordance with an embodiment of the present invention. Like the embodiment of FIG. 6, the called party is never connected to the call, the telephone never rings and the called party is not interrupted. Instead of playing a message to the called party and ending the call, the call is routed to voicemail or other automated answering system for the calling party to, at the calling party's option, leave a message. The method begins at block 700 and optionally proceeds to play a message to the calling party in block 702. The message can indicate the calling party that there call cannot be completed, however, they will be able to leave a message. The call is routed to the called party's voicemail box or other automated answering system as shown in block 704 for the caller to leave a message. The method ends in block 706.

Figure 8:
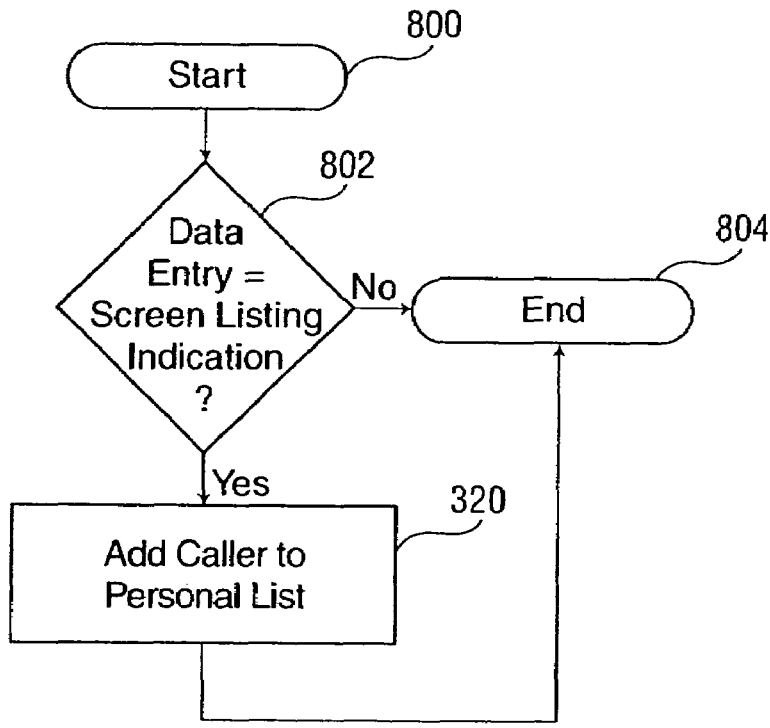
FIG. 8 presents a flow diagram illustrating a method for use with the method of FIG. 3 in accordance with an embodiment of the present invention.

FIG. 8 presents a flow diagram illustrating a method for use with the method of FIG. 3 in accordance with an embodiment of the present invention. In particular, a further enhancement of block 316 of FIG. 3 is provided that allows a called party to add the calling party's caller ID information to the personal list without taking the call. The method begins in block 800 and, in block 802, it is determined if a data entry was received from the called party that corresponds to a screen listing indication. Such an indication may be any suitable string of digits or characters, such as the three characters *##. In some telephony systems, the network may not detect dialed digits if the telephone is still on-hook. In accordance with an alternative embodiment of the present invention an off-hook signal followed by an on-hook signal within a predetermined time interval, such as 500 msec, can be interpreted as the prescribed data entry. In this fashion, the called party can pick up the telephone receiver and replace it quickly without the need to speak with the calling party while implementing the intercept feature in accordance with the present invention.

If the entered data corresponds to the screen listing indication, at block 320', the caller identification information associated with the call is added to the personal list for the called party in a manner similar to the functions performed in block 320 described in conjunction with FIG. 3.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. It should also be noted that the software implementations of the present invention can be stored on a tangible storage medium such as a magnetic or optical disk, read-only memory or random access memory and be produced as an article of manufacture.

While a particular embodiment of the present invention has been shown and described, modifications may be made. It is therefore intended in the appended claims to cover alls such changes and modifications which fall within the true spirit and scope of the invention.

The invention claimed is:

1. A communication system configured to process a call from a calling party at a calling communication station to a called party at a called communication station, the communication system comprising:

a first network element to detect a call processing query from a terminating switch and in response to the call processing query, to determine whether standard caller identification information for the calling communication station can be provided to the called communication station, the first network element being further operative to communicate a call processing message if standard caller identification information can not be provided, the call processing message including an identifier for the called communication station and a presentation indicator; and a second network element coupled with the first network element to receive the call processing message and to transmit a request for spoken caller identification information to the calling communication station and store the spoken caller identification information as audible caller identification information in response to the call processing message, and further to provide the audible caller identification information to the called communication station if the called party accepts the call, the second network element further to detect a screen listing indication from the called communication station, and the first network element operative to intercept subsequent calls from the calling communication station to the called communication station in response to the screen listing indication.

2. The communication system of claim 1 wherein the first network element obtains the standard caller identification information if the standard caller identification information can be provided, the first network element further comparing the standard caller identification information to a stored intercept list for the called communication station, and communicate a response message from the first network element to the terminating switch to complete the received call to the called party only if the standard caller identification information does not match an entry on the intercept list.

3. The communication system of claim 2 wherein a component of the communication system is configured to detect signaling from the called communication station indicating the standard caller identification for the calling communication station should be added to the intercept list for the called communication station if the standard caller identification was provided and the call was completed, and if the signaling is detected, add the standard caller identification for the calling communication station to the intercept list for the called communication station.

4. The communication system of claim 1 wherein the first network element is operative to detecting signaling by determining if a data entry was received from the called communication station and determining if the received data entry corresponds to a screen listing indication.

5. A method for processing calls in a communications system, the method comprising:
   (a) at a first network element of the communications system, detecting a call processing query associated with a received call from a calling party at a calling communication station to a called communication station;
   (b) determining if standard caller identification information for the received call for the calling communication station can be provided to the called communication station;
   (c) if standard caller identification information can be provided,
      (c1) obtaining the standard caller identification information, and
      (c2) comparing the standard caller identification information to respective entries of an intercept list;
      (c3) communicating a call processing response message from the first network element to complete the received call to the called party only if the standard caller identification information does not match an entry on the intercept list;
   (d) if standard caller identification information cannot be provided or if the standard caller identification information matches an entry of the intercept list,
      (d1) preventing completion of the call to the called communication station;
      (d2) sending a call processing message from the first network element to a second network element of the communications system to cause the second network element to request spoken caller identification information of the calling communication station and to subsequently play the spoken caller identification information to the called communication station when provided; and
      (d3) at the second network element, completing the received call only if the called party accepts the call;
   (e) if the standard caller identification was provided and the call was completed, detecting signaling from the called communication station indicating the standard caller identification for the calling communication station should be added to the intercept list for the called communication station; and
   (f) if the signaling is detected, adding the standard caller identification for the calling communication station to the intercept list for the called communication station.

6. The method of claim 5 wherein (d2) comprises:
transmitting a request for spoken identification information to the calling communication station, and
storing the spoken caller identification information, when provided.

7. The method of claim 5 further comprising the step of:
generating audible caller identification information using synthesized speech signals based on the standard caller identification information.

8. The method of claim 5 further comprising:
detecting in the call processing query a Called Party Identifier, the Called Party Identifier corresponding to the called communication station;
placing the Called Party Identifier in the call processing message as a Calling Party Identifier; and
marking a Presentation Indicator associated with the Calling Party Identifier in the call processing message as presentation allowed.

* * * * *